US 8,015,669 B2

(12) United States Patent
Huang et al.

(10) Patent No.: US 8,015,669 B2
(45) Date of Patent: Sep. 13, 2011

(54) HANDLE WITH A HIDDEN BELT

(75) Inventors: Chao-Fu Huang, Keelung (TW);
Chien-Chiang Huang, Taoyuan (TW)

(73) Assignee: Quanta Computer Inc., Tao Yuan Shien (TW)

( * ) Notice: Subject to any disclaimer, the term of this patent is extended or adjusted under 35 U.S.C. 154(b) by 507 days.

(21) Appl. No.: 12/222,640

(22) Filed: Aug. 13, 2008

(65) Prior Publication Data
US 2009/0255092 A1 Oct. 15, 2009

(30) Foreign Application Priority Data

Apr. 11, 2008 (TW) .............................. 97113265 A

(51) Int. Cl.
*A45C 3/00* (2006.01)

(52) U.S. Cl. .......... 16/405; 16/113.1; 16/114.1; 16/427; 16/428; 16/429

(58) Field of Classification Search ................. 16/110.1, 16/111.1, 113.1, 114.1, 405, 425, 427–429, 16/444, DIG. 24, DIG. 25; 150/107, 108, 150/110; 190/39, 115; 220/754, 756, 757, 220/761, 762–764; 224/578, 579
See application file for complete search history.

(56) References Cited

U.S. PATENT DOCUMENTS

| 2,769,475 | A | * | 11/1956 | Fisher | 190/115 |
|---|---|---|---|---|---|
| 2,987,150 | A | * | 6/1961 | Szabo | 16/405 |
| 3,198,300 | A | * | 8/1965 | Tuttle | 16/405 |
| 4,545,414 | A | * | 10/1985 | Baum | 224/580 |
| 4,978,044 | A | * | 12/1990 | Silver | 224/601 |
| 4,989,656 | A | * | 2/1991 | Derfler | 150/108 |
| 5,027,874 | A | * | 7/1991 | Gazzola | 150/108 |
| 5,897,039 | A | * | 4/1999 | Swenke | 224/162 |
| 6,115,883 | A | * | 9/2000 | Um | 16/405 |
| 6,471,105 | B1 | * | 10/2002 | Ammerman et al. | 224/625 |
| 6,726,071 | B2 | * | 4/2004 | Baseflug et al. | 224/258 |
| 6,995,977 | B2 | * | 2/2006 | Yang | 361/679.55 |
| 7,036,831 | B2 | * | 5/2006 | Coffman | 280/33.993 |
| 7,080,763 | B2 | * | 7/2006 | Allen et al. | 224/257 |
| 7,574,771 | B2 | * | 8/2009 | Cheng | 16/114.1 |
| 2003/0014837 | A1 | * | 1/2003 | Tsai | 16/113.1 |
| 2005/0224547 | A1 | * | 10/2005 | Krulik et al. | 224/578 |
| 2009/0174203 | A1 | * | 7/2009 | Kim | 294/156 |
| 2010/0053888 | A1 | * | 3/2010 | Nagamura et al. | 361/679.59 |

* cited by examiner

*Primary Examiner* — Victor Batson
*Assistant Examiner* — Roberta Delisle
(74) *Attorney, Agent, or Firm* — Rabin & Berdo, PC

(57) ABSTRACT

This present invention is a handle with a hidden belt, applying to a handle attached on a portable device, which uses torsion springs to draw the belt into the handle. Thus, a user can not only carry the portable device with the handle, but also shoulder or hang the portable device with the hidden belt of the handle.

16 Claims, 6 Drawing Sheets

HANDLE WITH A HIDDEN BELT

RELATED APPLICATIONS

This application claims priority to Taiwan Application Serial Number 97113265, filed Apr. 11, 2008, which is herein incorporated by reference.

BACKGROUND

1. Field of Invention

The invention relates to a handle with a hidden belt. More particularly, the invention relates to a handle with a hidden belt of a portable device.

2. Description of Related Art

Carry bags, single-belt bags or twin-belt packs are usually sold with notebook computers such that user's can easily and conveniently carry their notebook computer.

Besides, for the convenience for carrying a notebook, a handle attached to the notebook was used in the prior art. However the handle of a notebook can only be carried by hand. A carry bag or a pack is still required to carry a notebook over a long distance. When carrying a notebook by hand, the notebook is more susceptible to being dropped. Therefore, the handle applied to attach to a notebook in the prior art still needs to be improved.

SUMMARY

The invention is to provide a hidden belt in a handle of a portable device to enhance the convenience while carrying the portable device.

The invention provides a handle with a hidden belt implemented on a portable device. Using the elasticity of the torsion springs draws the belt back the handle and encloses the belt in the handle. Therefore, a user can carry the portable device with the handle or hang the portable device on his/her shoulder with the hidden belt.

The main purpose of this invention is to provide a handle with a hidden belt of a portable device, such as a notebook with a handle or a supporting stand. The belt is designed to be enclosed in the handle or the supporting stand. And when needed, the belt is pulled out from the handle or the supporting stand so that a user could pull out the hidden belt from the handle for shouldering. Besides, the handle or the supporting stand of the portable device can be used to handle the portable device. The handle or the supporting stand of the portable device can also be used to elevate the base of the portable device from a plane surface, such that the heat generated by the portable device can be dissipated easily. Moreover, the handle or the supporting stand can be used to elevate the base to form a slope for ergonomic concerns. That is, a user can type the keyboard on the base more easily if a back of the base is elevated.

The invention provides a handle with a hidden belt comprising: a handle body with a containing space therein; a handle opening disposed on an upper surface of the handle body; two torsion spring axles disposed on inner walls at two sides of the handle body inside the containing space; a belt enclosed in the containing space of the handle body, two ends of the belt tied on the two torsion spring axles; and a belt cover wrapping on the belt and can be glided on the belt; wherein the belt can be pulled out from the handle body through the handle opening by an external force or rolled on the two torsion spring axles in the handle body.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
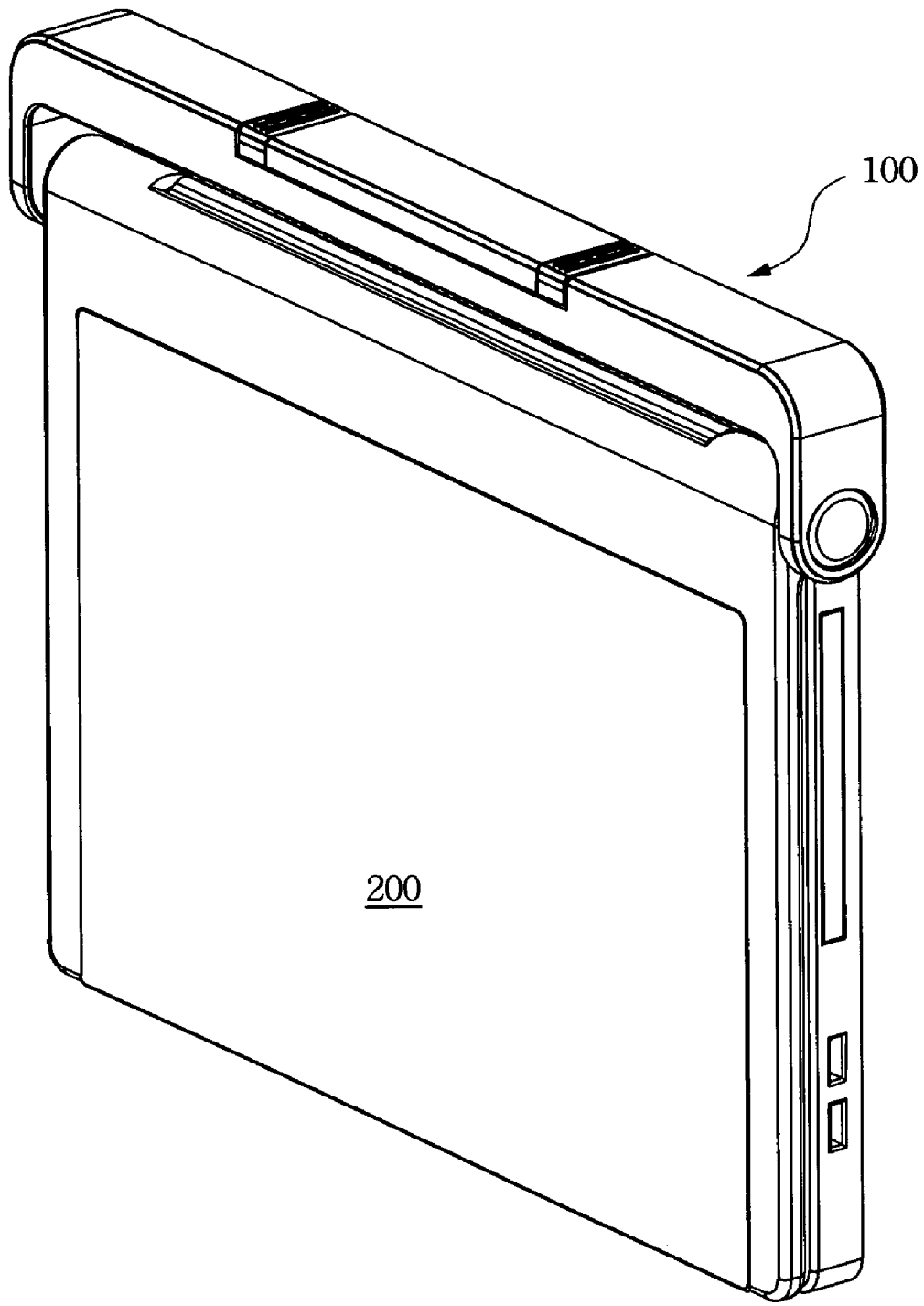
FIGS. 1A and 1B illustrate a preferred embodiment of a handle with a hidden belt according to the invention.

Reference will now be made in detail to the present embodiments of the invention, examples of which are illustrated in the accompanying drawings. Wherever possible, the same reference numbers are used in the drawings and the description to refer to the same or like parts.

Figure 1B:
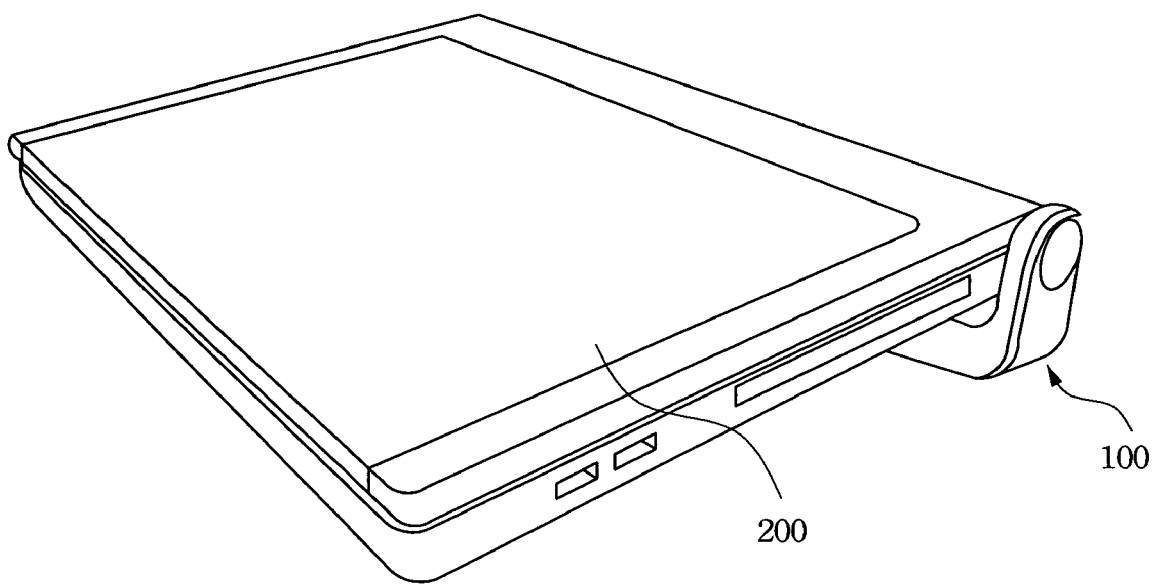

Refer to FIG. 1A and FIG. 1B. FIG. 1A and FIG. 1B illustrate the preferred embodiment of the handle with a hidden belt of this invention. As shown in FIG. 1A, the handle with a hidden belt 100 is implemented on the portable device 200 having a handle or a supporting stand, wherein the portable device 200 can be a notebook, a computer integrating system and screen in one body, or even a non-electronic device. With a hidden belt enclosed in the handle or the supporting stand, users could pull out the hidden belt from the handle for shouldering when needed, thus enhances the practicability and convenience. As shown in FIG. 1B, the handle or the supporting stand not only enables a user to easily carry the portable device 200 but also to lift the base of the portable device 200 from a plane surface to increase the efficiency of heat dissipation. Moreover, the handle or the supporting stand can also elevate the base of the portable device 200 to form a slope for ergonomic concerns, such as typing a keyboard on the base of the portable device 200.

Figure 2:
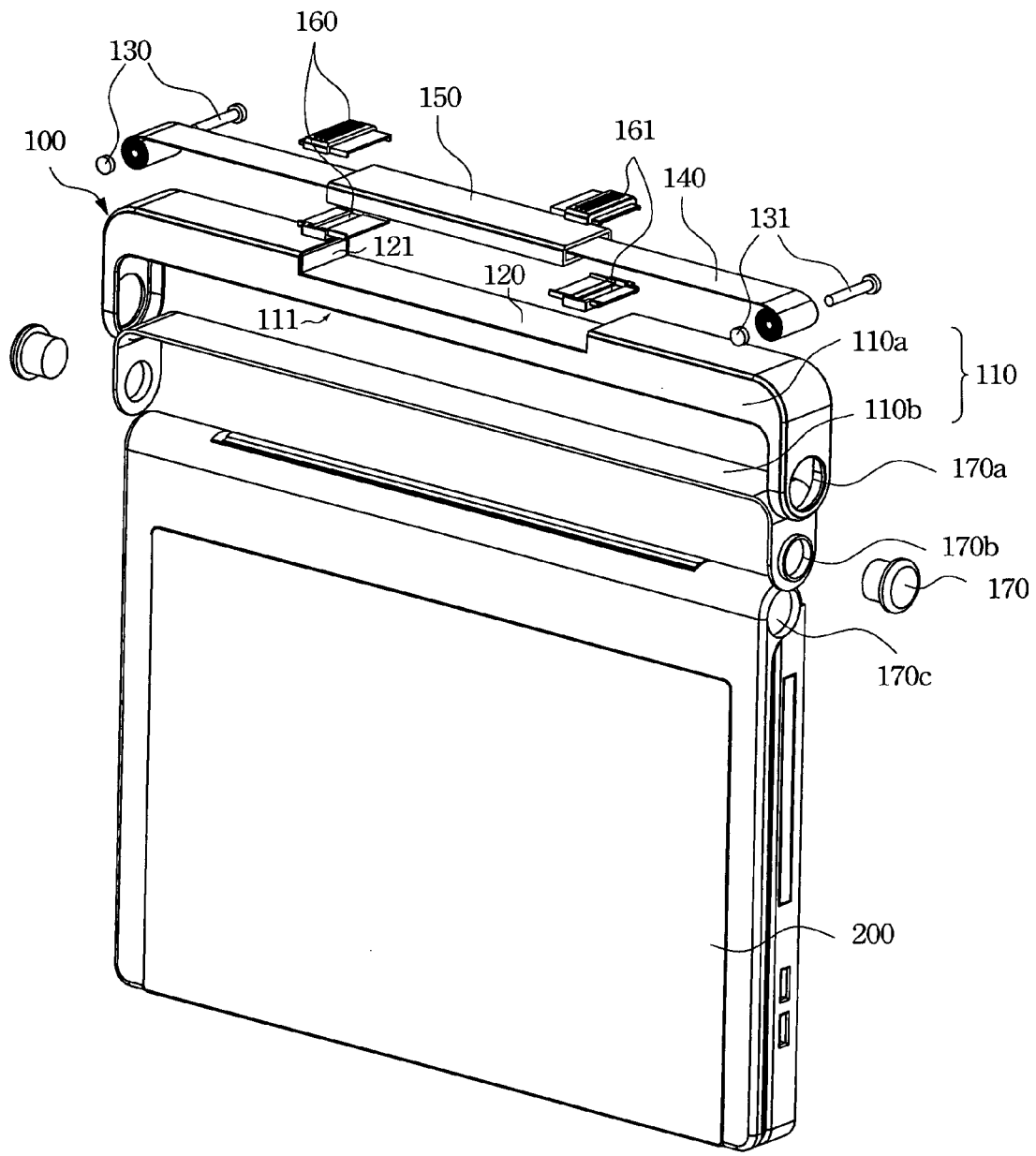
FIG. 2 illustrate a perspective exploded view showing an embodiment of present invention.

FIG. 2 illustrates a perspective exploded view showing an embodiment of this invention. As shown in FIG. 2, the handle with a hidden belt 100 comprises a handle body 110, a handle opening 120, two torsion spring axles 130 and 131, a belt 140, and a belt cover 150. The handle body 110 is provided to enable a user to carry the portable device 200. The handle body 110 is pivoted with the portable device 200 for rotating relative to the portable device 200. The handle body 110 has a containing space 111 therein to enclose the belt 140. In one embodiment of this invention, the handle body 110 can be assembled with an upper housing 110a and a lower housing 110b, or manufactured as a single piece. The upper housing 110a and the lower housing 110b respectively have the joint segment 170a and 170b. And the joint segment 170a and 170b are pivoted to the joint segment 170c of the portable device 200 by a hinge component 170. The handle opening 120 is disposed at the center area substantially of the upper surface of the handle body 110. The handle opening 120 has inner sidewalls 121 on both sides, and the belt 140 passes through the inner sidewalls 121 when drawn into or pulled out from the handle body 110. The shape, the position and the length of the handle opening 120 match those of the belt cover 150 to place the belt cover 150 therein. The torsion spring axles 130 and 131, which provide elasticity to draw the belt 140 back inside the handle body 110, are disposed on two sides of the containing space 111 in the handle body 110. The material of the belt 140 comprises Nylon. The two ends of the belt 140 are tied on the two torsion spring axles 130 and 131 respectively. The length of the belt 140 is longer than the longitudinal length of the handle body 110. Therefore, the belt 140 can be rolled on the two torsion spring axles 130 and 131 by the torsion elasticity. The belt cover 150 is a flexible rubber tube wrapped around the belt 140 movably. The belt cover 150 can be inserted in the handle opening 120 to close the containing space 111 such that it looks like a single object with the handle body 110 externally. Therefore, the belt 140 can be enclosed in the handle body 110 to be a hidden belt in a handle. Furthermore, the handle with a hidden belt further comprises two buckles 160 and 161 clipped on either side of the belt cover 150 and wrapped on the belt 140 movably as well. Because the belt cover 150 is a flexible rubber tube, it is hard to clasp with the sidewalls 121 when inserting the belt cover 150 in the handle opening 120. The buckles 160 and 161 are used to be positioning references for inserting the belt cover 150 to clasp on sidewalls 121 in the handle opening 120.

Figure 3A:
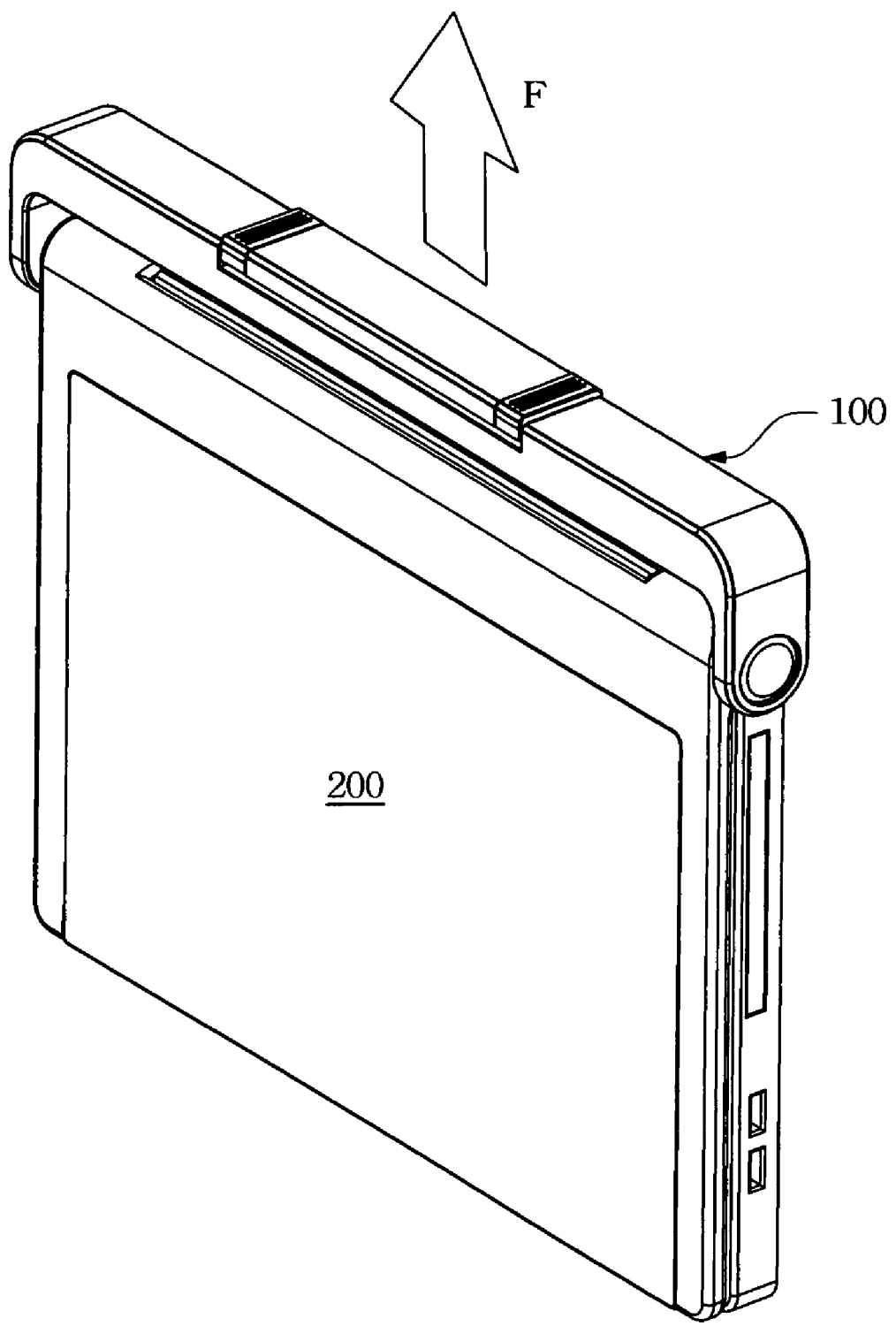
FIGS. 3A, 3B and 3C are diagrams illustrating the movement of the preferred embodiment of the handle with a hidden belt of this invention.
Figure 3B:
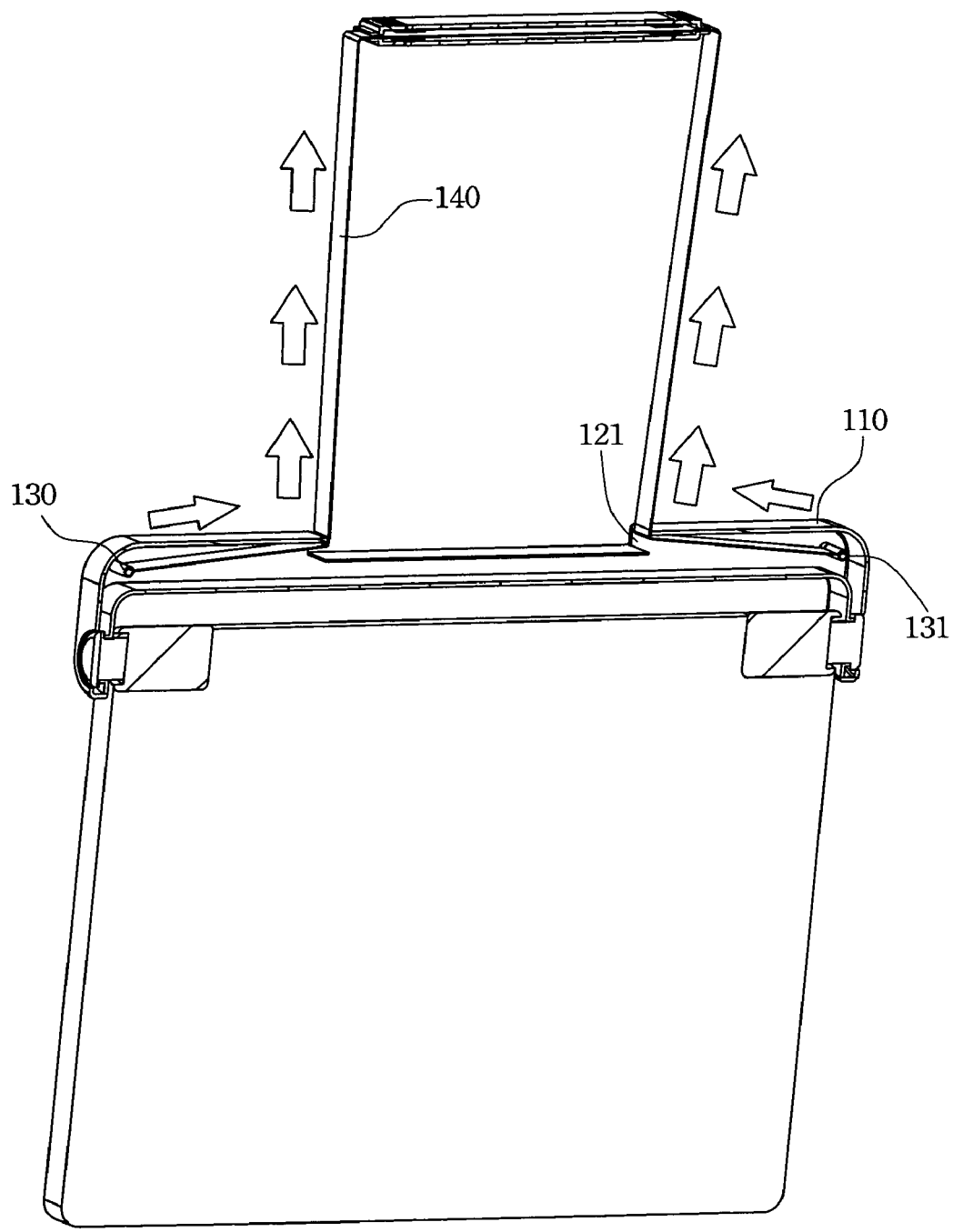
Figure 3C:
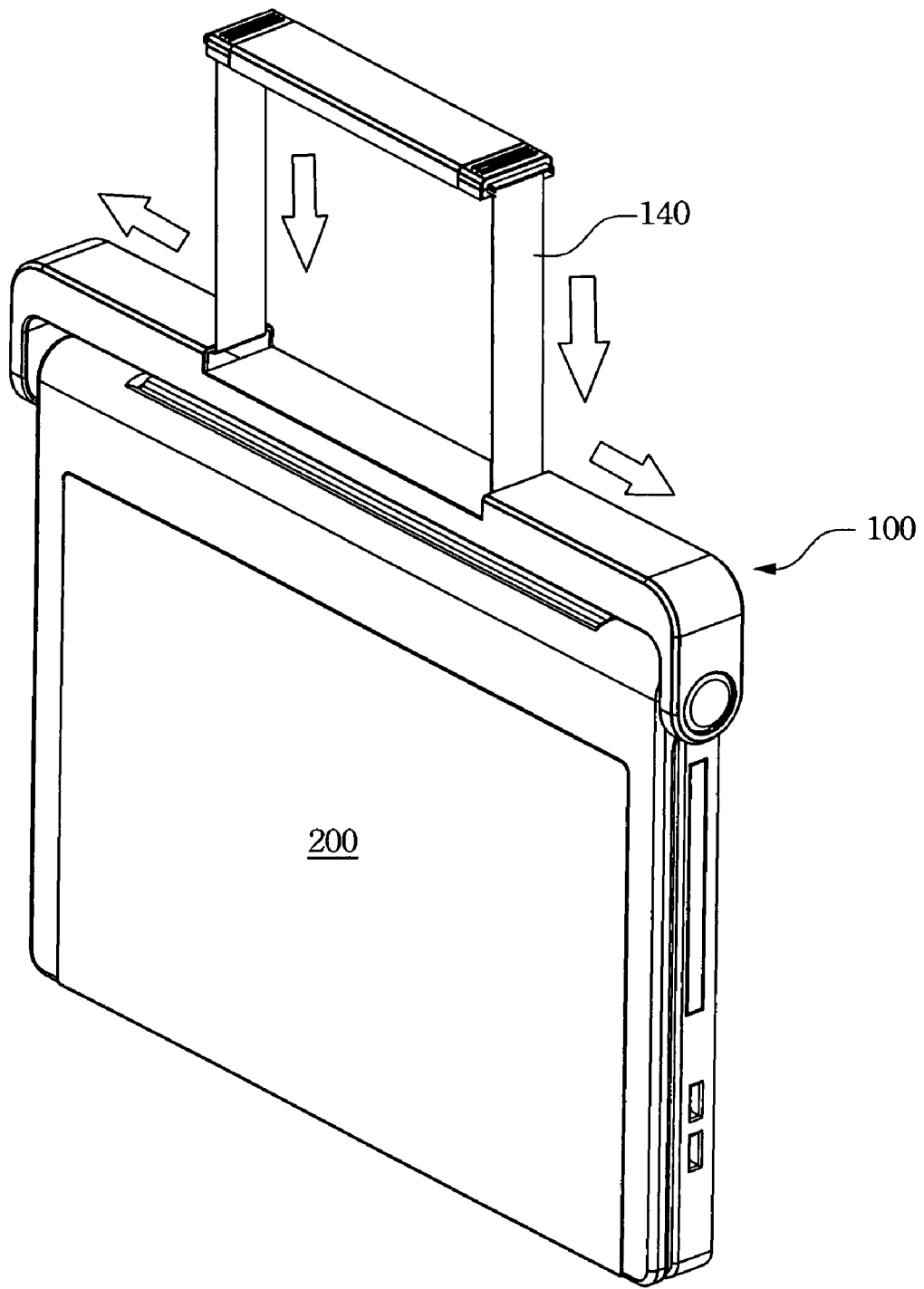

FIG. 3A, FIG. 3B and FIG. 3C are diagrams illustrating the movement of the preferred embodiment of the handle with a hidden belt of this invention. In FIG. 3A, the belt 140 of the handle 100 of the portable device 200 can be pulled out from the handle opening 120 by an external force F to shoulder or hang the portable device 200, as shown in FIG. 3B. And after the external force F is removed, the elasticity of the torsion spring axles 130 and 131 draws the belt 140 back into the handle body 110, as shown in FIG. 3C. That is, the belt 140 can be selectively pulled out from the handle body 110 through the handle opening 120 by an external force F or rolled on the two torsion spring axles 130 and 131 in the handle body 110.

Although the present invention has been described in considerable detail with reference certain embodiments thereof, other embodiments are possible. Therefore, their spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A handle with a hidden belt, comprising:
   a handle body having an upper housing, a lower housing, and a containing space, the upper housing and the lower housing respectively having joint segments for pivoting with a portable device;
   a handle opening disposed on a upper surface of the handle body;
   two torsion spring axles disposed at two sides of the containing space of the handle body;
   a belt enclosed in the containing space of the handle body and having two opposite ends tied on the two torsion spring axles respectively; and
   a belt cover wrapping on the belt movably,
   wherein the belt is operable to be pulled out from the handle body through the handle opening by an external force.

2. The handle with a hidden belt of claim 1, wherein the shape of the belt cover corresponds to the shape of the handle opening.

3. The handle with a hidden belt of claim 1, wherein the two torsion spring axles providing an elasticity to draw the belt back into the handle body while removing the external force.

4. The handle with a hidden belt of claim 1, further comprising two buckles for clipping two ends of the belt cover and wrapping on the belt movably as positioning references to clasp the belt cover with sidewalls of the handle opening.

5. The handle with a hidden belt of claim 1, wherein the belt comprises Nylon.

6. The handle with a hidden belt of claim 1, wherein the belt cover is a flexible rubber tube.

7. A portable device with a hidden belt handle, comprising:
   a device;
   a handle body pivoted with the device having an upper housing, a lower housing, and a containing space, the upper housing and the lower housing respectively having joint segments for pivoting with the device;
   a handle opening disposed on a upper surface of the handle body;
   two torsion spring axles disposed at two sides of the containing space of the handle body;
   a belt enclosed in the containing space of the handle body and having two opposite ends tied on the two torsion spring axles respectively; and
   a belt cover wrapping on the belt movably,
   wherein the belt is operable to be pulled out from the handle body through the handle opening by an external force.

8. The portable device with a hidden belt handle of claim 7, wherein the shape of the belt cover corresponds to the shape of the handle opening.

9. The portable device with a hidden belt handle of claim 7, wherein the shape of the belt cover corresponds to the shape of the handle opening to insert the belt cover in the handle opening.

10. The portable device with a hidden belt handle of claim 7, wherein the two torsion spring axles providing an elasticity to draw the belt back into the handle body while removing the external force.

11. The portable device with a hidden belt handle of claim 7, further comprising two buckles for clipping two ends of the belt cover and wrapping on the belt movably as positioning references to clasp the belt cover with sidewalls of the handle opening.

12. The portable device with a hidden belt handle of claim 7, wherein the belt comprises Nylon.

13. The portable device with a hidden belt handle of claim 7, wherein the belt cover is a flexible rubber tube.

14. The portable device with a hidden belt handle of claim 7, wherein the portable device is a portable electronic device.

15. The portable device with a hidden belt handle of claim 14, wherein the portable electronic device is a notebook.

16. A handle with a hidden belt, comprising:
   a handle body having a containing space;
   a handle opening disposed on a upper surface of the handle body;
   two torsion spring axles disposed at two sides of the containing space of the handle body;
   a belt enclosed in the containing space of the handle body and having two opposite ends tied on the two torsion spring axles respectively;
   a belt cover wrapping on the belt movably; and
   two buckles for clipping two ends of the belt cover and wrapping on the belt movably as positioning references to clasp the belt cover with sidewalls of the handle opening,
   wherein the belt is operable to be pulled out from the handle body through the handle opening by an external force.

* * * * *